United States Patent
Lindenmeier et al.

(10) Patent No.: US 6,574,460 B1
(45) Date of Patent: Jun. 3, 2003

(54) RADIOTELEPHONE SYSTEM FOR MOTOR VEHICLES WITH A GROUP ANTENNA

(75) Inventors: Heinz Lindenmeier, Planegg (DE); Rainer Kronberger, Hohenkirchen (DE); Jochen Hopf, Haar (DE); Leopold Reiter, Gilching (DE)

(73) Assignee: Fuba Automotive GmbH & Co. KG, Bad Salzdetfurth (DE)

(*) Notice: Subject to any disclaimer, the term of this patent is extended or adjusted under 35 U.S.C. 154(b) by 0 days.

(21) Appl. No.: 09/548,306

(22) Filed: Apr. 12, 2000

(30) Foreign Application Priority Data

Apr. 14, 1999 (DE) .......................................... 199 16 855

(51) Int. Cl.⁷ .......................... H04B 7/00; H04B 1/06; H01Q 3/00
(52) U.S. Cl. ..................... 455/277.1; 455/272; 455/275; 342/359; 342/383; 343/711; 343/704
(58) Field of Search ................................ 342/359, 383, 342/380, 375, 374, 378, 372; 343/713, 704, 711, 712, 714; 455/272, 275, 276.1, 277.1, 277.2, 296, 334, 562

(56) References Cited

U.S. PATENT DOCUMENTS

| | | | | |
|---|---|---|---|---|
| 5,619,214 A | * | 4/1997 | Lindenmeier et al. ...... | 343/704 |
| 5,764,185 A | * | 6/1998 | Fukushima et al. ......... | 342/359 |
| 5,848,361 A | * | 12/1998 | Edwards ...................... | 455/137 |
| 6,061,553 A | * | 5/2000 | Matsuoka et al. .......... | 455/273 |
| 6,377,213 B1 | * | 4/2002 | Odachi et al. .............. | 342/372 |
| 6,400,318 B1 | * | 6/2002 | Kasami et al. .............. | 342/372 |
| 2001/0016478 A1 | * | 8/2001 | Lindenmeier et al. ... | 455/277.1 |
| 2002/0025793 A1 | * | 2/2002 | Meijer et al. ............... | 45/277.1 |

FOREIGN PATENT DOCUMENTS

DE 44 08 744 9/1995

* cited by examiner

Primary Examiner—Nguyen T. Vo
Assistant Examiner—Kamran Afshar
(74) Attorney, Agent, or Firm—Collard & Roe, P.C.

(57) ABSTRACT

A radiotelephone system for motor vehicles, having a group antenna system with a plurality of antenna elements, and a mobile radiotelephone with a high-frequency input for receiving radio signals. The group antenna system contains controllable phase and/or amplitude adjusting elements, which are set so that a directed reception with a main receiving direction is available. The controllable phase and/or amplitude adjusting elements are controlled by a processor for tracking the main receiving direction azimuthally in the direction of a fixed station with the help of a tracking signal. Controllable switching-elements for reversing antenna signals for diversity reception are integrated in the signal paths of the group antenna system so that the azimuthal main direction of reception is tracked with a defined tracking by setting a combination of the switching positions of the controllable switching elements. Thus, the antenna reception patterns are changed when the switches of the controllable switching elements are changed, and a changed received signal is available in each case on the high-frequency input of the mobile radiotelephone. When a reception interference is detected, a diversity processor selects from the possible combinations of switching positions, another combination to reduce or eliminate interference.

19 Claims, 5 Drawing Sheets

RADIOTELEPHONE SYSTEM FOR MOTOR VEHICLES WITH A GROUP ANTENNA

BACKGROUND OF THE INVENTION

1. Field of the Invention

This invention relates to a radiotelephone system for motor vehicles with a group antenna installation having a plurality of antenna elements coupled to a mobile radiotelephone with a high-frequency input 14.

2. The Prior Art

Motor vehicle antennas for mobile radiotelephony (e.g. GSM) in the form of group antenna system are known from German Patent DE 44 08 744.6 and have been designed heretofore exclusively as antennas with omnidirectional characteristics. This provides a preferred dimensioning for a time-invariant radiation characteristic for a permanent connection between the base station and the mobile subscriber in a moving motor vehicle. Antenna elements are typically employed for this purpose that are secured on the rear window as glued on-glass antennas and/or mounted on the roof of the vehicle. The electrically short antenna elements are necessarily associated with strong coupling to the electrically conductive body of the motor vehicle, so that the antenna properties have to be specifically selected so that the effect of the radiation properties of the antenna is taken into account.

A time-invariant radiation characteristic has a drawback in that due to the omnidirectional characteristic of the radiation required for mobile radiotelephony, no gain can be obtained through radiation focusing based on the given prevailing direction of incidence of the electromagnetic waves from the direction of the fixed station. Therefore, an antenna gain can be achieved only with the help of a focusing group antenna whose main direction of reception can be adjusted to the actual direction leading to the fixed station, and which is continually reset during driving. It has been found that even with pronounced focusing of the radiation diagram, fading occurs during reception due to multi-way propagation. Such fading has an interference effect with respect to the quality of the received signal. With digitally modulated signals, such fading and the reception interference connected therewith lead to increased bit error rates.

SUMMARY OF THE INVENTION

Therefore, the invention provides a group antenna for a moving vehicle at low cost, with improved reception quality through increased focusing in the radiation diagram, and avoids the reception interference that is associated with fading.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
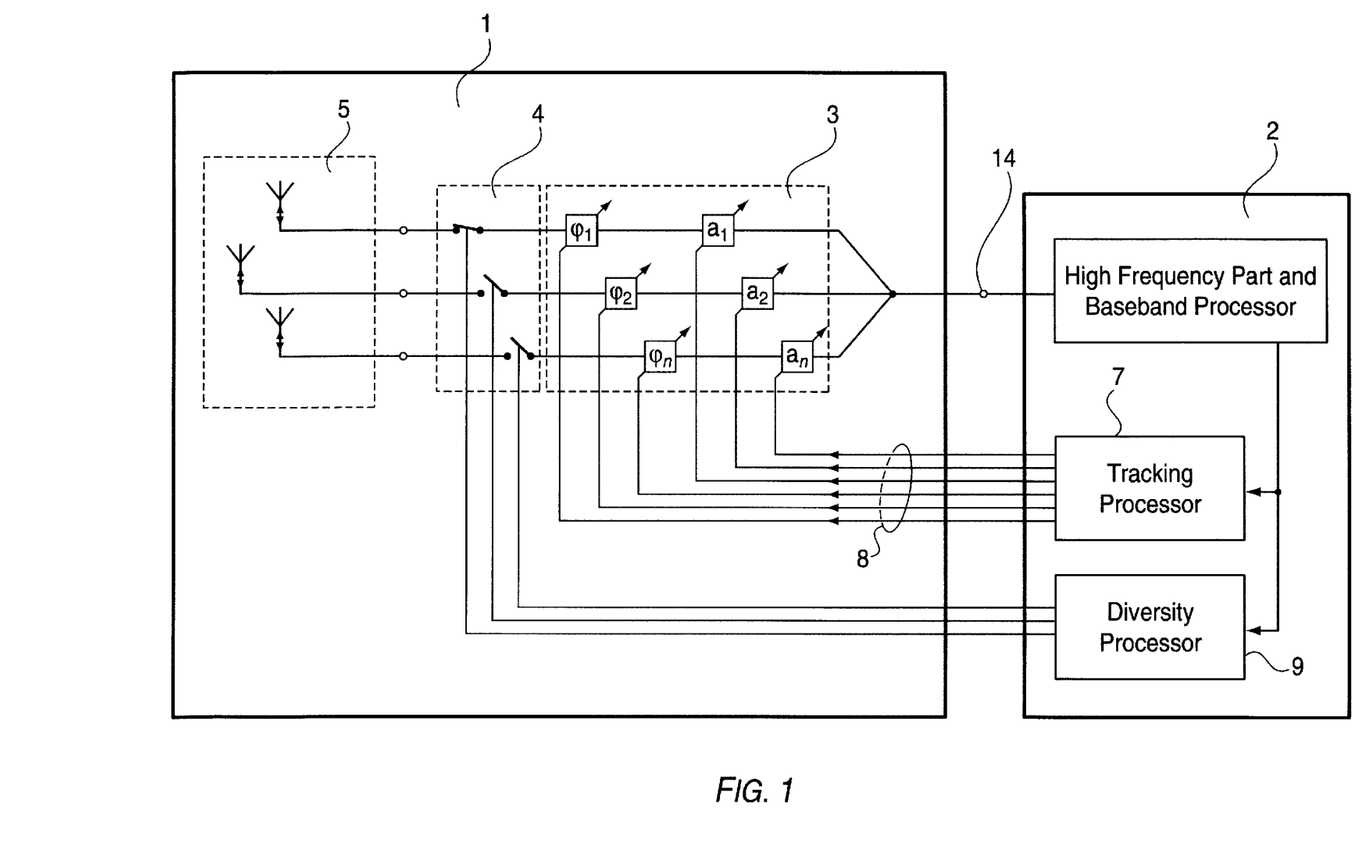
FIG. 1 shows a radiotelephone installation with a group antenna system according to the invention.

Referring to FIG. 1, there is shown a radiotelephone installation having a group antenna system 1, with antenna elements 5, associated phase and/or amplitude adjusting elements 3 for forming a directional diagram that can be tracked. There are provided controllable switching elements 4 coupled between antenna elements 5 and adjusting elements 3, for adjusting the tracking circuit combination or for adjusting different received signals for switch positions deviating from the tracking circuit combination. The mobile radiotelephone 2 contains a processor 7 for tracking the main reception direction and for adjusting the phase and/or amplitude adjusting elements 3, via line 8 as well as the diversity processor 9 for adjusting the controllable switching elements 4.

The radiotelephone installation of FIG. 1 provides a substantial improvement of the radio connection between the mobile telephone installation and the fixed station. This improvement can be realized at favorable cost savings. Antenna elements 5 can be in the form of short rod emitters with a low structural height of about 30 to 50 mm. Moreover, the required phase and/or amplitude adjusting members 3 can be wired in a discrete form, as shown in FIG. 3, via the phase and/or amplitude switches 12. Switching position processor 6, which, jointly with group antenna system 1, forms one unit, can control the controllable switching elements 4 and the phase and/or amplitude switches 12, which can be designed as diodes. A suitable control line 16 controls the switching position processor 6 with information received from processor 7 for tracking the main reception direction, as well as from diversity processors 9, said processors being housed in the mobile radiotelephone 2 in the present example, the main direction of reception is found by means of a control and search process with the help of a receiver level measuring device 11 as seen in FIG. 2, which is connected downstream from the HF-part with its base-band processor for determining the level on the high-frequency input 14 of the mobile radiotelephone 2.

Figure 2:
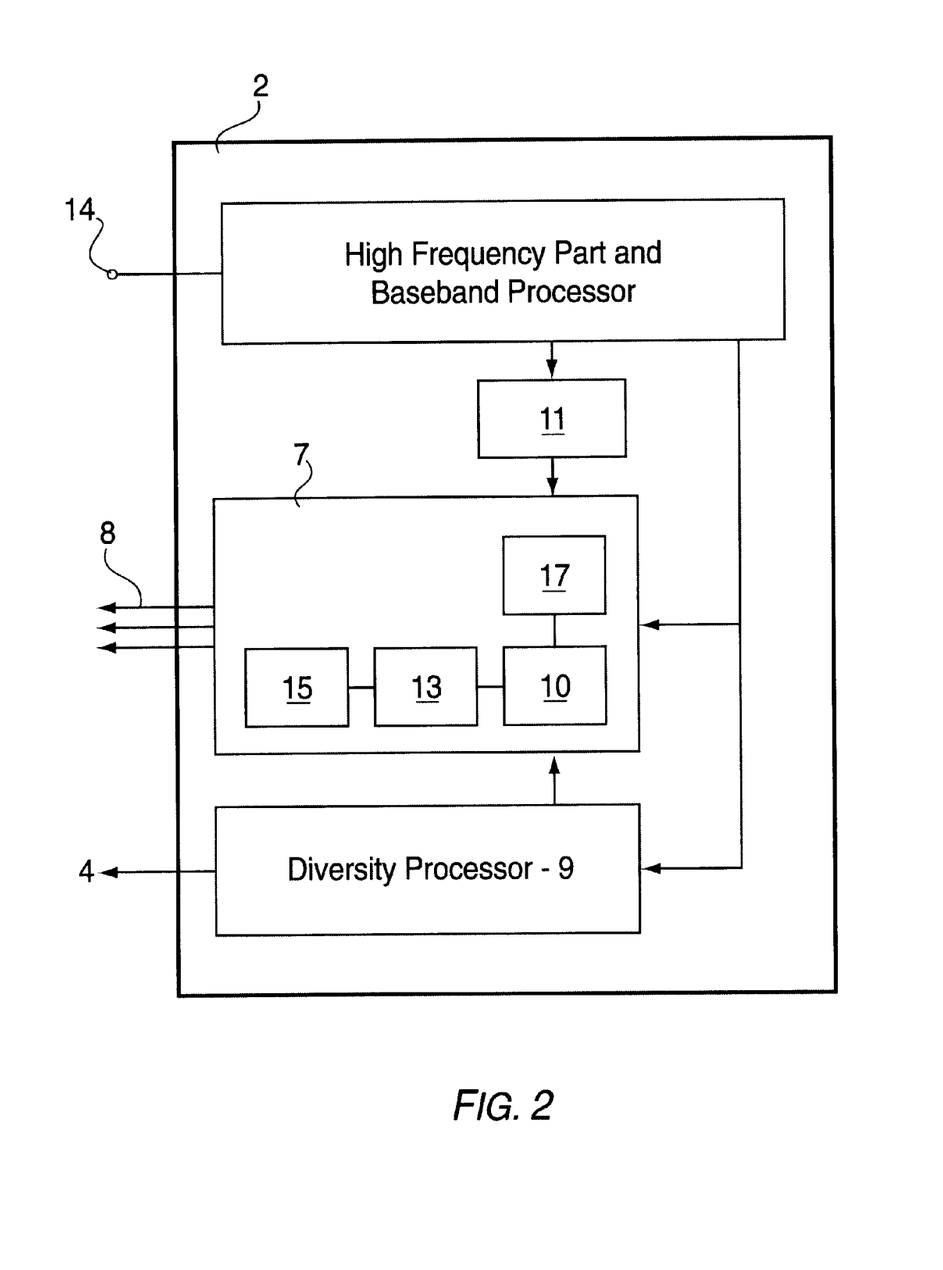
FIG. 2 shows the radiotelephone with high-frequency input circuit.
Figure 3:
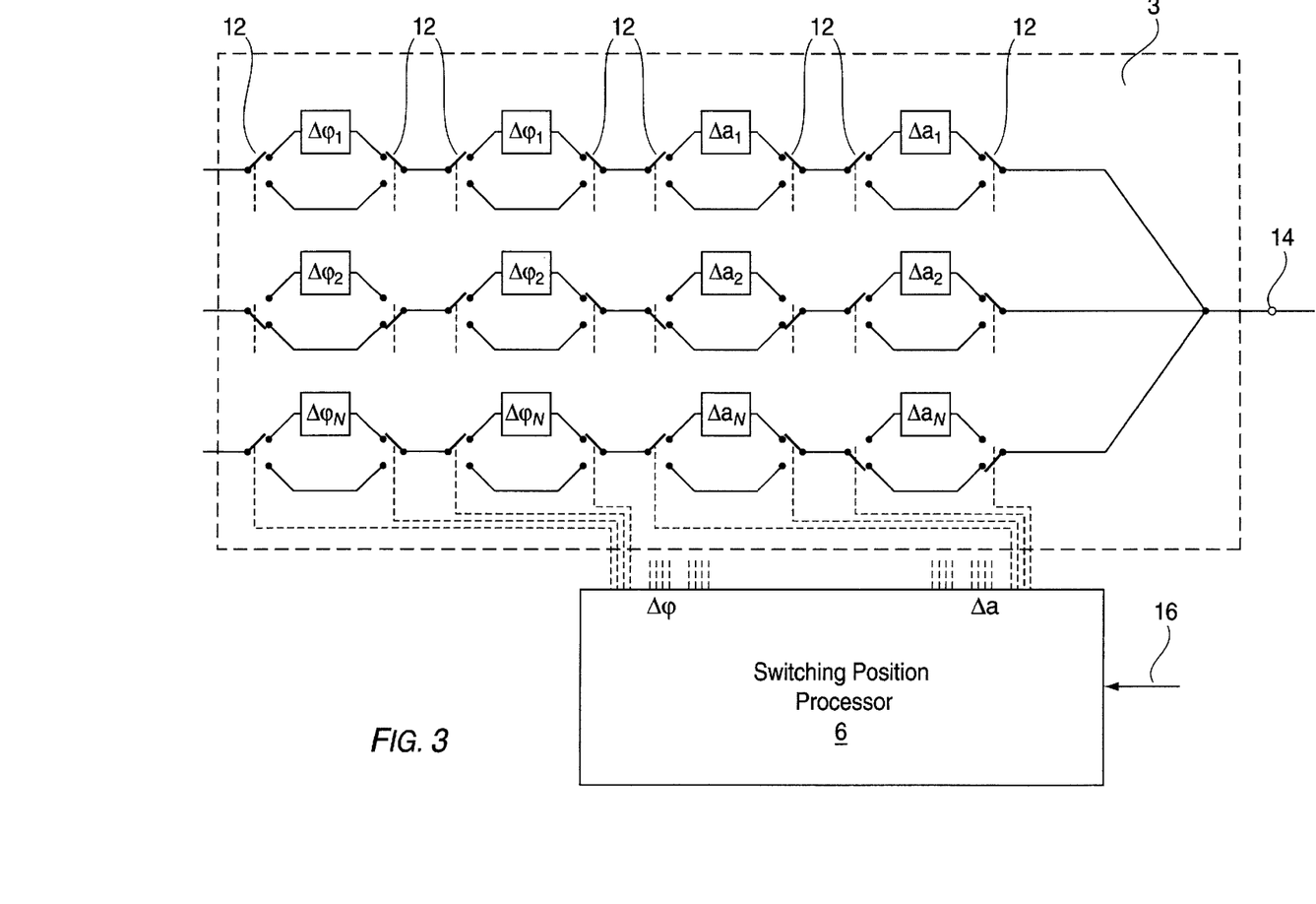
FIG. 3 is an operating circuit for phase and amplitude adjustment.

FIG. 2 shows radiotelephone 2 with the high-frequency input 14 and the receiver level measuring device 11 contained in radiotelephone 2 for determining the level of the high-frequency received signal. Processor 7 for tracking the main direction of reception, contains a controlling device 17 for tracking the main reception direction via the phase and/or amplitude adjusting elements 3, a stop device 13 for stopping the tracking control process, and a memory 15 for storing the main radiation direction. If tracking signal 8 is missing after a pre-selected time has elapsed after the controllable switching elements 4 have been set to the tracking switching position 18 and the phase and/or amplitude setting elements 3 have been adjusted, an omnidirectional radiation pattern is made possible with the help of a timing element 10.

FIG. 3 shows an operating circuit of the phase and/or amplitude adjusting elements 3, which can be set in a fixed way. With the help of the phase and/or amplitude switches 12, adjusting elements 3 adjust different phases and/or amplitudes for combination on the high-frequency input 14 of the mobile radiotelephone 2. The control takes place with the help of the switching position processor 6, which is supplied by processor 7 via a control line 16 for tracking the main reception direction.

Figure 4A:
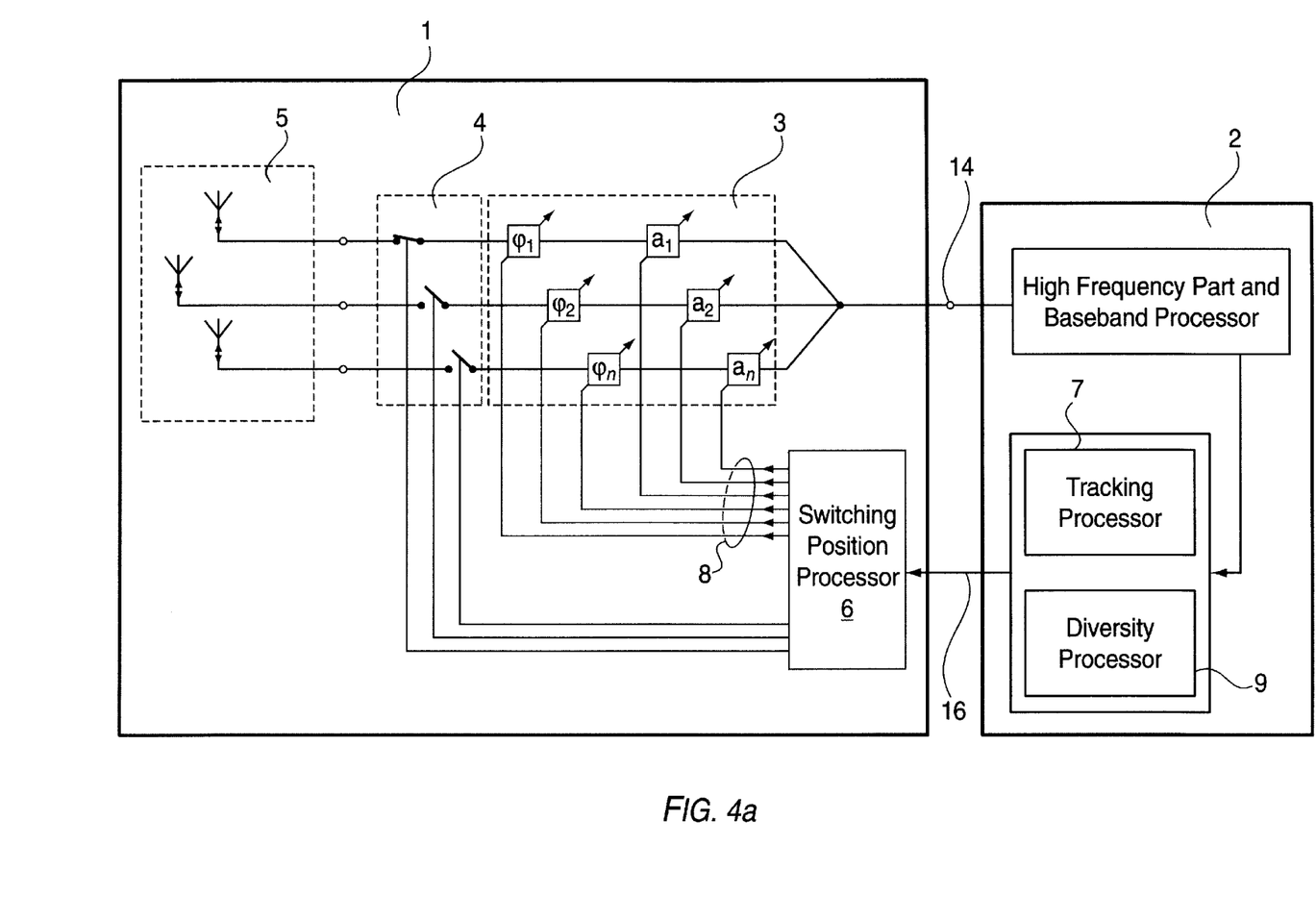
FIG. 4a shows the group antenna system with a switching position processor.

FIG. 4a shows the group antenna system 1 with a switching position processor 6, the latter being accommodated within a unit of components. Processor 6 controls both the phase and/or amplitude adjusting elements 3 for defining the tracking directional diagram or plot, as well as the controllable switching elements 4 for setting the tracking switching position combination 18 (FIG. 4b) to different switching positions according to the operation of the diversity antennas.

Figure 4B:
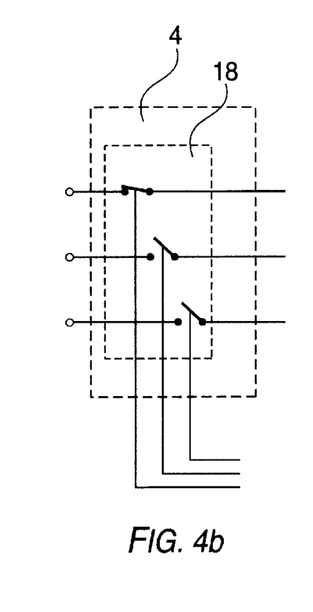
FIG. 4b is a circuit showing the slaving switching position combination of the controllable switching elements.

FIG. 4b shows the tracking switching position combination 18 of controllable switching elements 4. The control and search process is carried out with the help of processor 7 for tracking the main receiver direction.

In the simple embodiment with the controllable switching a elements 4 as shown in FIG. 1, all controllable switching elements 4 are closed to produce a focused radiation pattern and, in this position, form the tracking switching position combination 18. This position of the switches is maintained during reception until diversity processor 9 detects a reception interference as a result of fading, and then opens at least one of the controllable switching elements 4. The signals of the three signal branches shown therefore will no longer cancel each other, and the effect of fading disappears provided that the antenna element whose controllable switching element 4 was opened supplies a received signal. The combination of alternative switching positions of controllable switching elements 4 permits a large number of diversity possibilities, so that the probability for receiving an interference-free signal on the high-frequency input 14 is very high. Moreover, an algorithm is selected with the help of diversity processor 9 that will successively test all switching possibilities in the event interference occurs, so that the tracking switching position combination 18 is contained in this sequence as well.

If the adjustment of the controllable switching elements 4 deviates from the tracking switching position combination 18, it is advantageous to maintain, during this deviation time, the adjustment of the phase and/or amplitude adjusting elements 3. The controlling device 7 for tracking the main reception direction is stopped with the help of stopping device 13, which advantageously is contained in processor 7 for tracking the main reception direction, and which receives from diversity processor 9, a signal that a reception interference is present.

Figure 5:
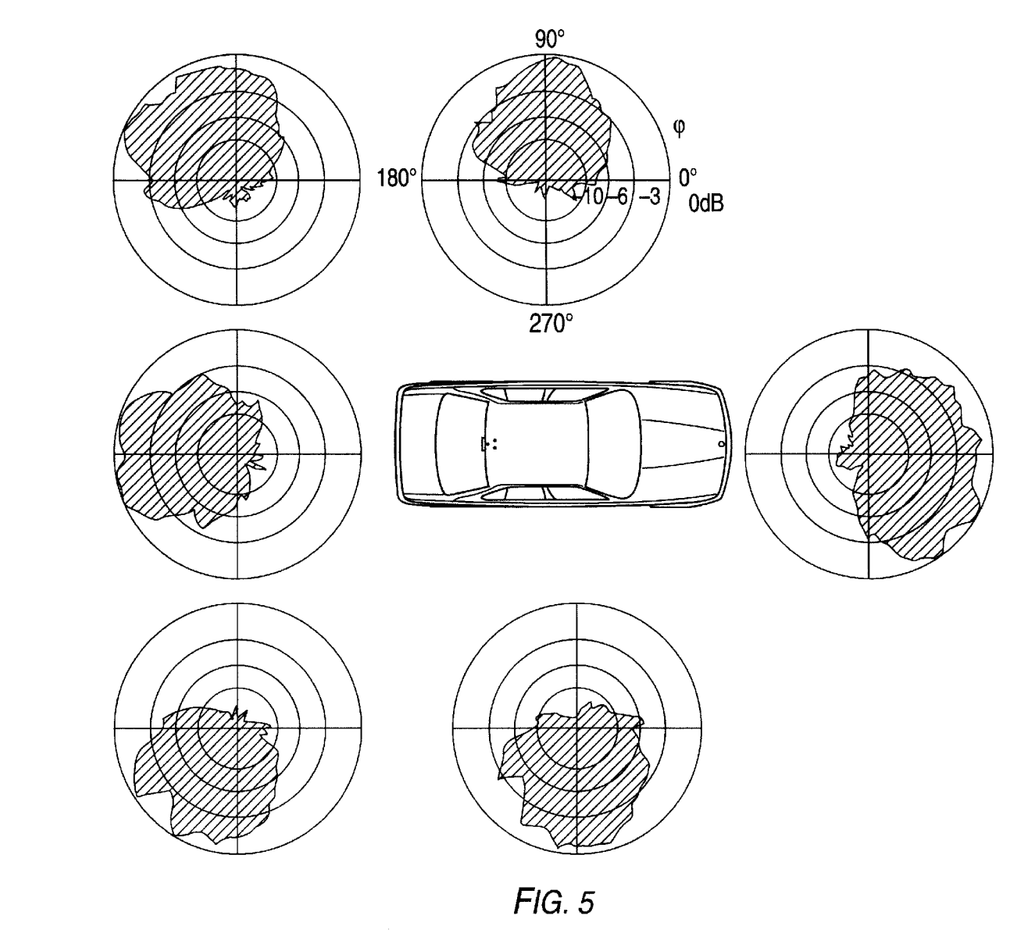
FIG. 5 shows an example of a group antenna system, with three antenna elements, together with their reception patterns.

FIG. 5 shows an example of a group antenna system 1 with the three antenna elements 5, mounted on the motor vehicle near the rear edge of the roof. The azimuth directional diagrams shown for different adjustments of the phase and/or amplitude adjusting elements 3 can be achieved with this system. In the example shown, f=900 MHz.

The invention offers the advantage that for receiving signals, the main reception direction to a remote station can be adjusted. Moreover, in the event of a signal transmission by the radiotelephone, the main direction of radiation can be adjusted with the help of phase and/or amplitude adjusting elements 3. This particularly applies to mobile radio communication systems operating in the time duplex mode, which reverse between transmitting and receiving in alternating sequences, and where there is no relevant change in the relative position of the vehicle with respect to the fixed station during periods of transmitting or receiving. However, for a mobile radio system with the time duplex mode operating at different transmitting and receiving frequencies such as, for example GSM, the phase and/or amplitude adjusting elements 3 can be set differently in this connection accordingly, controlled by processor 7 for tracking the main direction of reception.

The process described above for determining the main receiving direction takes place autonomously in the radiotelephone installation with the help of a search and control process. In connection with future mobile radiotelephone systems, however, it is conceivable that either the direction of the RF waves received by the fixed station or the direction of the waves emitted by the mobile station is determined. When such directional information is transmitted in the data telegram, this could be communicated to the mobile station for adjusting and tracking the main direction of reception If a navigation system as currently commonly employed is available, which transmits the direction of orientation of the motor vehicle to the mobile radiotelephone 2 in the form of an electrical signal, the main direction of reception could be tracked with the help of processor 7 for tracking the main receive direction. If the complete geographical position of the vehicle and its orientation are available, only knowledge of the geographical position of the fixed station would be required in order to determine the vector of distance between the vehicle and the fixed station in processor 7 for tracking the main direction of reception, and adjust and track the main reception direction according to the direction of its vector.

In connection with mobile radiotelephone systems with digital modulation, the bit error rate can serve as a measure for the reception quality, and thus as a criterion for reception interference. When a defined permissible bit error rate is exceeded, the diversity processor will then successively switch to a different received signal by reversing the controllable switching elements 4. However, the determination of the bit error rate necessarily requires the lapse of a significant number of cycle times. In order to arrive at shorter reaction times of the diversity processor, it is therefore useful if reception interference can be detected in the high-frequency or intermediate-frequency signal. With the minimum shift keying (MSK) form of modulation employed in modern mobile radiotelephone networks, the high-frequency carrier is emitted in successive bits according to digital modulation with a fixed frequency deviation by $\pm\nabla f$. When reception interference occurs in frequency modulated systems, frequency interference peaks occur in connection with amplitude breaks The simultaneous occurrence of this type of interference in the frequency and amplitude of the high-frequency carrier is preferably used as a very rapidly detecting diversity criterion. Reversing to a superior signal can be realized in this way after just a few cycles.

Accordingly, while only a few embodiments of the present invention have been shown and described, it is obvious that many changes and modifications may be made thereunto without departing from the spirit and scope of the invention.

What is claimed is:

1. A radiotelephone system for motor vehicles having a group antenna system with a plurality of antenna frequency input comprising:
   an antenna system having a plurality of controllable switching elements with their inputs coupled to said plurality of antenna elements:
   a plurality of controllable phase and/or amplitude adjusting elements coupled to the output of said switching elements for providing an antenna pattern that can be tracked;

a radiotelephone comprising;

a tracking processor for tracking the main direction of reception azimuthally in the direction of a fixed station, and producing at its output a tracking signal that is coupled to said adjusting elements;

a diversity processor having its output coupled to said switching elements for selectively changing the antenna pattern of the group antenna system;

a baseband processor having its input coupled to the output of said adjusting elements and having its output coupled to the input of said tracking processor and said diversity processor so that changes in the received signal due to interference will activate said diversity processor to activate said switching elements to select antenna elements to minimize interference, and the tracking signal produced by said tracking processor will adjust the amplitude and phase of said adjusting elements to track the direction of the main reception signal.

2. The radiotelephone system according to claim 1 additionally comprising a time duplex mode, wherein said controllable switching elements each assume a defined switching position during the transmission periods of the mobile radiotelephone system, and the phase and/or amplitude adjusting elements of group antenna system are set so that the strongest radiation pattern is generated with respect to the radio connection to the fixed station, and that the change-over from transmitting to receiving operation and vice versa is effected by the switching signals from the said radiotelephone.

3. The radiotelephone system according to claim 2, wherein said controllable switching elements and said phase and/or amplitude adjusting elements are set during the transmitting periods of the mobile radiotelephone system so that the radiation pattern formed by the transmitting frequency of the mobile radiotelephone system has a main direction of transmission identical with the main direction of reception of the received frequency signal during periods of reception from a remote station.

4. The radiotelephone system according to claim 2, wherein the adjustment of said controllable switching elements and the adjustment of said phase and/or amplitude adjusting elements are the same during the transmission and reception periods when the transmitting and the receiving frequencies are the same.

5. The radiotelephone system according to claim 1, comprising a device disposed in the radiotelephone for determining the geographical position and the alignment of the motor vehicle as a astronomical horizontal coordinate and produced as an electrical signal, and wherein the geographical position of the fixed station is also available in the radiotelephone as an electrical signal through transmission in the data telegram of the fixed station, and wherein the optimal azimuthal main direction of reception resulting therefrom in relation to the alignment of the motor vehicle is provided in said tracking processor in the form of a tracking signal for tracking the main receiving direction based on the vector of distance between the positions of the fixed station and the motor vehicle, and the alignment of the vehicle.

6. The radiotelephone system according to claim 1, additionally comprising a device disposed in the motor vehicle for producing an electrical signal responsive to alignment of the motor vehicle in the form of the astronomical horizontal coordinate, said electrical signal being provided to said radiotelephone, and comprising a further device in the fixed station for fixing the azimuthal direction of incidence of the radiation emitted by the motor vehicle as an electrical signal, said directional signal also being provided to said radiotelephone as an electrical signal through transmission in the data telegram of the fixed station, wherein the optimal azimuthal main receiving direction in relation to the alignment of the motor vehicle resulting therefrom is available in said tracking processor in the form of the tracking signal for tracking the main receiving direction based on the directional information available in said radiotelephone.

7. The radiotelephone system according to claim 1, comprising a reception level measuring device disposed in said radiotelephone for determining the reception level, said tracking processor including a controlling device for tracking the main direction of reception, the main direction of reception being adjusted by said controlling device so that the signal reception level averaged over a driving distance of a few wavelengths is as high as possible.

8. The radiotelephone system according to claim 7, wherein said tracking processor includes a timing element for tracking the main direction of reception, so that, upon disappearance of the tracking signal, said timing element, after a preset delay, actuates said controllable phase and/or amplitude adjusting elements, for tracking the direction of the main received signal so that the radiation pattern of the group antenna system on the motor vehicle has the optimal azimuthal omnidirectional radiation pattern, and, provides a single focusing of the radiation in the vertical direction at small elevational angles.

9. The radiotelephone system according to claim 1, wherein during the development of the radio connection with the fixed station prior to the availability of the tracking signal, the controllable phase and/or amplitude adjusting elements are set by said processor for tracking the main receiving direction so that the radiation pattern of the group antenna system on the motor vehicle has the best possible azimuthal omnidirectional radiation and, provides a single focusing of the radiation in the vertical direction for small elevational angles.

10. The radiotelephone system according to claim 1, wherein said phase and/or amplitude adjusting elements are designed for infinitely variable adjustment, and that the tracking of the main receiving direction takes place steplessly or in small angular steps.

11. The radiotelephone system according to claim 1, wherein said phase and/or amplitude adjusting elements are designed for adjustment in discrete steps, so that the radiation patterns partially covering each other and having half-power widths of adapted sizes with different azimuthal main receiving directions are associated with the individual steps, and wherein the entire azimuth is covered by tracking the main receiving direction through selection of the main receiving direction with the maximal received signal level.

12. The radiotelephone system according to claim 1, wherein said phase and/or amplitude adjusting elements comprise a combination of phase shifters and/or amplitude elements adjusted to a fixed setting, said shifters and/or elements having amplitude switches and being controlled by a switching position processor so that a radiation pattern, having an associated azimuthal main receiving direction is provided through a defined combination of switching positions.

13. The radiotelephone system according to claim 7, wherein said tracking processor comprises a stopping device for stopping said controlling device during periods of reception in the event of deviation of the combination of the switching positions of the controllable switching elements from the tracking switching position combination in the presence of reception interferences detected by said diversity processor, and, during transmitting periods in said processor for tracking the main direction of reception, and storing the last occurred tracking signal into a memory, so that the last adjusted main direction of reception remains set in each case during the time in which the tracking switching position combination is not available.

14. The radiotelephone system for mobile radiotelephone systems according to claim 1, wherein said antenna elements are designed as electrically short rod emitters having a substantially vertical orientation, said rod emitters being mounted on the rook or rear window of the motor vehicle, or near the rear edge of the roof of a passenger motor vehicle for vertical polarization.

15. The radiotelephone system according to claim 12, wherein said group antenna system is designed in the form of a constructional unit containing said antenna elements, said phase and/or amplitude adjusting elements, said phase and/or amplitude switches, said controllable switching elements, said switching position processor for controlling said phase and/or amplitude adjusting elements, said phase and/or amplitude switches as well as said controllable switching elements, and wherein a control line is disposed between said mobile radiotelephone and said group antenna system for further transmitting the output signals of processor located in said radiotelephone for tracking the main direction of reception, and said diversity processor.

16. The radiotelephone system according to claim 1, wherein said diversity processor is designed so it recognizes a received interference when a permissible bit error rate is exceeded.

17. The radiotelephone system according to claim 1, having frequency modulation wherein said diversity processor is designed to recognize a received interference when a permissible interference frequency swing is exceeded.

18. The radiotelephone system according to claim 1, wherein said diversity processor is designed to recognize a received interference when a permissible interference frequency swing is exceeded in association with the simultaneously occurring exceeding of a permissible amplitude swing caused by interference.

19. A method of communication for moving vehicles using a radiotelephone system connected to a group antenna system with a plurality of antenna elements for receiving signals at high frequencies from a fixed station in order to improve reception and eliminate fading and interference comprising the steps of:

tracking the main direction of reception azimuthally of the direction of the fixed station using a tracking processor which produces a tracking signal;

adjusting the phase and amplitude of the received signal using adjusting elements in response to said tracking signal;

selectively changing the antenna pattern of said antenna elements by means of a diversity processor which produces a switching signal at its output in response to changes in the received signal due to fading and interference;

selectively switching different antennas elements in response to said switching signal, by means of switching elements that connect said antenna elements to said adjusting elements, so as to produce an optimal antenna receiving and transmitting pattern.

\* \* \* \* \*

UNITED STATES PATENT AND TRADEMARK OFFICE
CERTIFICATE OF CORRECTION

PATENT NO. : 6,574,460 B1
DATED : June 3, 2003
INVENTOR(S) : Lindenmeier et al.

It is certified that error appears in the above-identified patent and that said Letters Patent is hereby corrected as shown below:

Column 4,
Line 62, after the word "antenna" (second occurrence) and before the word "frequency", please insert the phrase:
-- elements and connected to a radiotelephone through a high --.

Signed and Sealed this

Twenty-sixth Day of July, 2005

JON W. DUDAS
*Director of the United States Patent and Trademark Office*